US007733770B2

(12) United States Patent
McAlpine et al.

(10) Patent No.: US 7,733,770 B2
(45) Date of Patent: Jun. 8, 2010

(54) CONGESTION CONTROL IN A NETWORK

(75) Inventors: Gary McAlpine, Banks, OR (US);
Tanmay Gupta, Hillsboro, OR (US);
Manoj Wadekar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 11/114,641

(22) Filed: Apr. 25, 2005

(65) Prior Publication Data

US 2006/0104298 A1   May 18, 2006

Related U.S. Application Data

(60) Provisional application No. 60/628,308, filed on Nov. 15, 2004.

(51) Int. Cl.
*G01R 31/08* (2006.01)
*H04B 3/20* (2006.01)
*H04L 12/50* (2006.01)
*H04L 12/28* (2006.01)

(52) U.S. Cl. .................. 370/229; 370/230; 370/235; 370/292; 370/363; 370/389; 370/395.1

(58) Field of Classification Search ......... 370/229–235, 370/251–257, 412
See application file for complete search history.

(56) References Cited

U.S. PATENT DOCUMENTS

| 5,379,297 A | 1/1995 | Glover et al. |
| 5,910,955 A | 6/1999 | Nishimura et al. |
| 6,091,709 A | 7/2000 | Harrison et al. |
| 6,134,218 A | 10/2000 | Holden |

(Continued)

OTHER PUBLICATIONS

Grow, "The Structure for Congestion Management", Congestion Management Study Group Meeting, May 24-25, 2004, Long Beach CA, 13 pages.

(Continued)

*Primary Examiner*—Huy D Vu
*Assistant Examiner*—Brandon Renner

(57) ABSTRACT

A source node receives related frames of data to be transmitted from the source node to a destination node and places the frames in a queue. The queue is associated with a communication path over which the related frames are to be transmitted to the destination node. An interface that couples the source node to the communication path receives an indication directed to the source node of traffic congestion in the communication path. In response, the source node controls the rate at which the related frames of data are transferred from the queue to a transmit buffer accessible to the interface, in order to relieve the traffic congestion in the communication path.

8 Claims, 2 Drawing Sheets

U.S. PATENT DOCUMENTS

| | | | |
|---|---|---|---|
| 6,320,859 B1* | 11/2001 | Momirov | 370/395.1 |
| 6,424,624 B1 | 7/2002 | Galand et al. | |
| 6,628,609 B2* | 9/2003 | Chapman et al. | 370/229 |
| 6,697,378 B1* | 2/2004 | Patel | 370/468 |
| 6,721,273 B1 | 4/2004 | Lyon | |
| 6,741,555 B1 | 5/2004 | Li et al. | |
| 6,771,601 B1* | 8/2004 | Aydemir et al. | 370/231 |
| 6,778,546 B1 | 8/2004 | Epps et al. | |
| 7,046,665 B1* | 5/2006 | Walrand et al. | 370/392 |
| 7,292,567 B2* | 11/2007 | Terrell et al. | 370/363 |
| 7,349,403 B2 | 3/2008 | Lee et al. | |
| 7,369,491 B1* | 5/2008 | Beshai et al. | 370/230 |
| 2002/0141427 A1 | 10/2002 | McAlpine | |
| 2003/0016685 A1 | 1/2003 | Berggreen | |
| 2003/0048750 A1 | 3/2003 | Kobayashi | |
| 2003/0137938 A1* | 7/2003 | Belanger et al. | 370/230 |
| 2003/0174700 A1* | 9/2003 | Ofek et al. | 370/389 |
| 2005/0041587 A1* | 2/2005 | Lee | 370/236 |
| 2005/0108444 A1* | 5/2005 | Flauaus et al. | 710/15 |
| 2005/0157645 A1 | 7/2005 | Rabie et al. | |
| 2006/0083186 A1* | 4/2006 | Handforth et al. | 370/310 |
| 2007/0291716 A1* | 12/2007 | Morales Barroso | 370/338 |

OTHER PUBLICATIONS

Hedge et al., "IEEE Congestion Management—Presentation for IEEE Congestion Management Study Group", Congestion Management Study Group Meeting, May 24-25, 2004, Long Beach CA, 16 pages.

Thatcher, "Congestion Mangaement (CM)—Managing the Layer Stack", Congestion Management Study Group Meeting, May 24-25, 2004, Long Beach CA, 44 pages.

Martin, "A Survey of Standards Efforts on Traffic & Congestion Mangaement in Ethernet Networks", Congestion Management Study Group Meeting, May 24-25, 2004, Long Beach CA, 14 pages.

"Congestion Management in a Bladed System", Congestion Management Study Group Meeting, May 24-25, 2004, Long Beach CA, 5 pages.

Lynskey, "Preemption Simulations", Congestion Management Study Group Meeting, May 24-25, 2004, Long Beach CA, 10 pages.

Wadekar et al., "Proposal for 802.3 Enhancements for Congestion Management", Congestion Management Study Group Meeting, May 24-25, 2004, Long Beach, CA, 23 pages.

Finn, "VLANs, Classes of Service, and Flows", Congestion Management Study Group Meeting, Jul. 13-15, 2004, Portland, OR, 19 pages.

Wadekar et al., "Proposal for CM Enhancements in 802.3", Congestion Management Study Group Meeting, Jul. 13-15, 2004, Portland, OR, 14 pages.

Ayandeh et al.,"IEEE 802.3 Flow Control Baseline Requirements", Congestion Management Study Group Meeting, Jul. 13-15, 2004, Portland, OR, 11 pages.

Gupta et al., "TCP/IP Modeling for Congestion Management", Congestion Management Study Group Meeting, Jul. 13-15, 2004, Portland, OR, 16 pages.

"Congestion Management 101 . . . or maybe 55½", Congestion Management Study Group Meeting, Jul. 13-15, 2004, Portland, OR, 29 pages.

"CMSG Problem Statement: Where We Started and Where We Are", Congestion Management Study Group Meeting, Jul. 13-15, 2004, Portland, OR, 8 pages.

"IEEE 802.3 Congestion Management Study Group July Plenary Report", Congestion Management Study Group Meeting, Jul. 13-15, 2004, Portland, OR, 14 pages.

Daines, "1:1 Oversubscription", Congestion Management Study Group Meeting, Sep. 27-28, 2004, Ottawa CA, 12 pages.

Booth, "Ethernet Management", Congestion Management Study Group Meeting, Sep. 27-28, 2004, 2004, Ottawa, CA, 14 pages.

Wadekar et al.,"Rate Control in Short Range 802.3 Interconnects", Congestion Management Study Group Meeting, Sep. 27-28, 2004, Ottawa CA, 21 pages.

Thaler, "Congestion Spreading—The Dark Side of Link-Based Congestion Control", Congestion Management Study Group Meeting, Sep. 27-28, 2004, Ottawa CA, 10 pages.

Barrass et al., "Problem Space for Ethernet Congestion Management", Congestion Management Study Group Meeting, Sep. 27-28, 2004, Ottawa CA, 32 pages.

"Joint Objectives list—few thoughts", Congestion Management Study Group Meeting, Sep. 27-28, 2004, Ottawa CA, 5 pages.

"Problem Space for Ethernet Congestion Management", Congestion Management Study Group Meeting, Sep. 27-28, 2004, Ottawa CA, 35 pages.

"IEEE 802.1F- 1993", IEEE Standards for Local and Metropolitan Area Networks: Common Definitions and Procedures for IEEE 802 Management Information, 1993, 39 pages.

"IEEE 802.1G", 1998 Edition, Part 5: Remote Media Access Control (MAC) Bridging, 221 pages.

"IEEE 802.1H", 1997 Edition, Part 5: Media Access Control (MAC) Bridging of Ethernet V2.0 in Local Area Networks, 18 pages.

"IEEE 802.1Q", 203 Edition, Virtual Bridged Local Area Networks, 312 pages.

"IEEE 802.1X-2001, Port-Based Network Access Control", 2001, 134 pages.

"IEEE 802.3ae-2002, Part 3: Carrier Sense Multiple Access with Collision Detection (CSMA/CD) Access Method and Physical Layer Specifications", Amendment: Media Access Control (MAC) Parameters, Physical Layers, and Management Parameters for 10 Gb/s Operation, 516 pages.

ASI SIG, "Advanced Switching Core Architecture Specification", Revision 1.0, Dec. 2003, 366 pages.

Aydemir et al.,"Flow Control in Gbs Ethernet Networks", IBM, Nov. 11, 1998, 31 pages.

International Search Report for PCT Patent Application No. PCT/US2005/035410, mailed on Apr. 12, 2007, 9 pages.

International Search Report and Written Opinion for PCT Patent Application No. PCT/US2005/035410, mailed on Feb. 14, 2006, 11 pages.

Final Office Action received for U.S. Appl. No. 10/957,895, mailed on Mar. 26, 2008, 12 pages.

Non Final Office Action received for U.S. Appl. No. 10/957,895, mailed on Oct. 15, 2007, 18 pages.

Non Final Office Action received for U.S. Appl. No. 11/227,897, mailed on Jan. 22, 2009, 26 pages.

Kant, "Introduction to Clusters" http://www.linuxclusters.com/books/clusters/chapter1/ (retrieved from the web on Apr. 26, 2005) 12 pages.

Kant, "Cluster Interconnects" http://www.linuxclusters.com/books/clusters/chapter3/ (retrieved from the web on Nov. 2, 2004) 9 pages.

HP BladeSystem p-Class networking, (retrieved from the web on Oct. 27, 2005) 2 pages http://h18004.wwwl.hp.com/products/bladescomponents/bl-p-interconnect-switch.html.

HP ProLiant BL p-Class Networking Overview, 5982-2202EN, May 2004.

Computerworld, "IBM to resell InfiniBand switch", (Retrieved from the web on Oct. 27, 2004)2 pg.http://www.computerworld.com/printthis/2004/0,4814,89037,00.html.

Gravel, Penton Media, Inc., "Novel Interconnect Scheme Enhances Comm Design" http://www.elecdesign.com?Articles/Print.cfm?ArticleID=8649 (retrieved from the web on Oct. 27, 2004) 8 pages.

Strod, EETIMES, "RapidIO moves up to Fabric" (retrieved from the web on Oct. 27, 2004) http://www.eet.com/article/showArticle.jhtml?articleId=26100703 3 pages.

Cummings, EETIMES, "AdvancedTCA helps NPU-based redesigns" 3 pages http://www.eetimes.com/article/showArticle.jhtml?articleld=18311105 (retrieved from the web on Oct. 27, 2004).

Gravel, Fulcrum Microsystems, "Asynchronous logic and faster ICs" 3 pages http://www.electronicproducts.com/print.asp?ArticleURL=novfull.nov2003 (retrieved from the web on Oct. 27, 2004).

Quinnell, "Meeting the I/O Bandwidth Challenge" Switched Interconnect Technologies Resource Catalog 2004, http://www.extensionmedia.com/interconnect/article.php?article=2 4 pages.

Stunkel, "The SP2 high-performance switch—IBM mainframe computer" 18 pages (retrieved from the web on Oct. 27, 2004) http://www.findarticles.com/p/articles/mi_mOISE/is_n2_v34/ai_17285756/print.

Hill, Motorola Computer Group, "RapidIO Expands Usage as System-Wide Control and Data Plane Interconnect" (retrieved from web Oct. 27, 2004) 8 pages http://www.rtcmagazine.com.home/printthis.php?id=100141.

Gravel, "Rethinking interconnects for layer 4-7 flexibility, performance" 7 pages http://www.fulcrummicro.com/Press/commsdesign_03-0715.htm (retrieved from web Oct. 27, 2004).

IEEE 802 CMSG Tutorial, San Antonio, TX, Nov. 16, 2004 pp. 1-41.

Regnier, et al, "TCP Onloading for Data Center Servers", IEEE 0018-9162, Nov. 2004.

Regnier, et al, "ETA: Experience with an Intel Xeon Processor as a Packet Processing Engine", Intel Corporation, 7 pages, Jan. 2004.

Noureddine et al, "Selective Back-Pressure in Switched Ethernet Lans*", (retrieved from web Apr. 26, 2005) http://66.102.7.104/search?q=cache:S-5S3T2C-04J:mmnetworks.stanford,edu/waelnour/d . . . 14 pages.

* cited by examiner

CONGESTION CONTROL IN A NETWORK

This application claims the benefit of provisional application No. 60/628,308, filed on Nov. 15, 2004, entitled An Architecture for Congestion Management in Ethernet Clusters.

TECHNICAL FIELD

The invention relates to controlling the rate of data transmission between nodes based on traffic congestion in the communication path between the nodes.

BACKGROUND

A node communicating with another node via a communication medium may use multiple transmit queues for buffering frames of data to be transmitted from an output port (for example, an input/output port or outlet) of the node to the other node. Generally, each frame of data is selected to be stored in one of the transmit queues based on some criteria such as type, class or quality of service associated with the frame, or data in the frame. Each transmit queue may receive frames from multiple higher layer virtual entities such as virtual circuits (VCs), virtual local area networks (VLANs), connections, or flows.

In any case, if frames of data are generated or received at the node faster than the frames can be transmitted to the other node, the transmit queue(s) begin to fill up with frames. Generally, recently received frames wait in a queue while frames received ahead of them in the queue are first transmitted, resulting in "head of line" blocking, since frames at the head of a transmit queue block, at least temporarily, other frames in the queue from being transmitted. In addition, frames may be queued at intermediate points between the two nodes, such as at intermediate nodes, or stages in a switched interconnect, in the communication path between the two nodes, thereby encountering the "head of the line" blocking issue at multiple points between the two nodes. The period of time a frame remains in a queue at each node increases the overall period of time it takes for the frame to be transmitted between the nodes. This increase in time taken to transmit a frame from one node to another node in a network setting generally is referred to as network latency.

If a transmit queue in a node fills up and cannot accept any further frames, any additional frames received at the node may be discarded. Typically, an end station node or node at which the frames originate need not discard the additional frames, rather such nodes rely on upper layer protocols and application layer mechanisms to detect congestion and back off for a period of time before generating further frames of data for transmission. An intermediate node in an internetwork, such as a network layer (layer 3) router, however, may need to discard additional frames if a transmit queue therein cannot accept any further frames, since the intermediate node is merely receiving the frames from another node.

Applications executing on the respective nodes may be communicating data with each other and time out, or hang, waiting for the data to arrive from the other node, or detect the loss or absence of data that was discarded and request the data be retransmitted. Latency and retransmission negatively affect throughput and bandwidth of the communication medium over which the nodes communicate.

The approaches discussed above generally do not provide enough transmit queues for non-blocking throughput in a node or a network. One approach is to provide separate transmit queues for related traffic transmitted by a node. A traffic flow may be defined as related frames of data transmitted between two nodes during a communication session between instances of respective applications executing on the nodes. Given there may be multiple instances of multiple applications executing on each node, and multiple sessions between these instances, the number of transmit queues needed for this approach is not easily determined, if not unbounded.

A simple form of controlling flow of frames ("flow control") between nodes occurs when one or more transmit queues in a node fills with frames to the point the node discards frames that would otherwise be transmitted to another node. Essentially, this type of flow control is binary in manner—either a frame is transmitted or it is not. Another form of flow control involves a node ("the receiving, or destination, node") that is congested sending a message, for example, a pause frame, to another node ("the transmitting, or source, node") from which it is receiving frames. The message instructs the transmitting node to stop transmitting frames to the receiving node for a selected short period of time, or until another message is sent from the receiving node instructing the transmitting node to begin transmitting frames again. If this type of flow control is used over each link, there is no need to discard frames within the switched interconnect.

The latter type of flow control is used, for example, between nodes in Ethernet Local Area Networks (LANs) adhering to the Institute for Electrical and Electronic Engineers (IEEE) 802.3 standard for the CSMA/CD (Carrier Sense Multiple Access/Collision Detection) protocol, including Ethernet, operating over Fast Ethernet (100 Mbps), Gigabit Ethernet (1000 Mbps), and 10 Gigabit Ethernet (10,000 Mbps) networks. See IEEE 802.3-2002: IEEE Standard for Information technology—Part 3: CSMA/CD Access Method and Physical Layer Specifications, and IEEE 802.3ae-2002: IEEE Standard for CSMA/CD Access Method and Physical Layer Specifications-Media Access Control (MAC) Parameters, Physical Layer and Management Parameters for 10 Gb/s Operation, for further information on flow control in Ethernet networks.

These flow control techniques do not take into consideration the sources and destinations of flows of traffic that contribute to congestion within a switched interconnect and, therefore, do not specifically flow control only the traffic contributing to the congestion.

DETAILED DESCRIPTION

Figure 1:
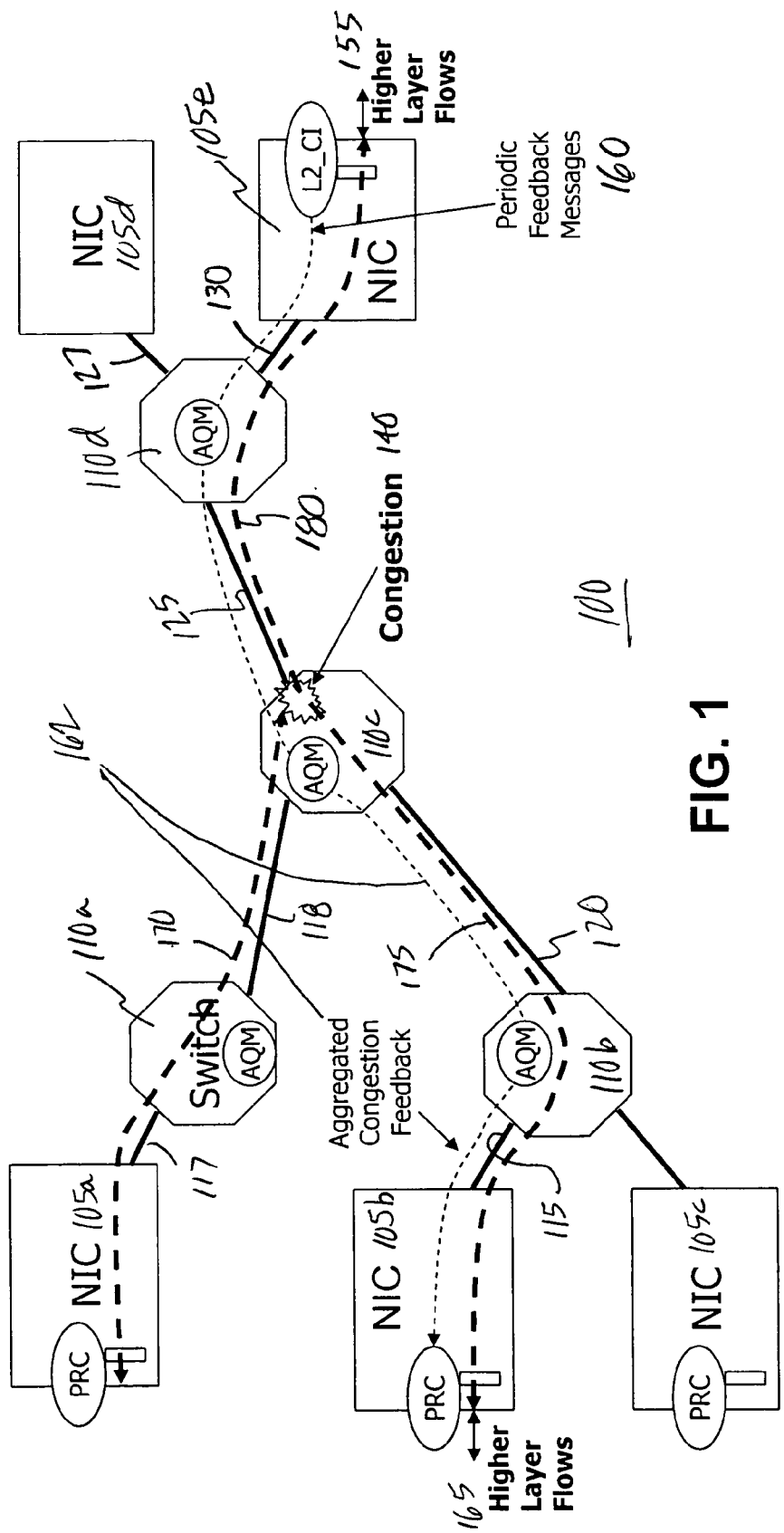
FIG. 1 is a diagram of a switched interconnect in which an embodiment of the invention may be implemented.

A cluster of computing systems may be interconnected by a network, for example, an Ethernet LAN. The computing systems may be referred to as nodes in the network. Alternatively, the cluster of nodes may be interconnected via a communication fabric that includes switching nodes or stages linked together, so that one or more communication paths may exist between any two nodes in the cluster. The communication fabric may thus be referred to as a cluster interconnect, or switched interconnect. Although Ethernet is typically used in a local area network (LAN) environment, Ethernet may also be used in a cluster interconnect environment, given that the IEEE 802.1 bridging protocol, IEEE 802.3 link layer protocol, and the Internet Engineering Task Force (IETF) network and transport protocols, such as TCP and IP, are widely deployed, well understood, low-cost, and interoperable. (See IEEE 802.1D-2004: Standard for Local and Metropolitan Area Networks: Media Access Control (MAC) Bridges; IETF Request for Comment (RFC) 793: Transmission Control Protocol (TCP), DARPA Internet Program Protocol Specification, September, 1981; and Postel, J., "Internet Protocol", RFC-791, USC/Information Science Institute, September, 1991, for more information on these protocols).

Upper layer protocol congestion control mechanisms, such as used in TCP, generally are optimized for long-range Internet topologies rather than short-range cluster networks or switched interconnects. The typical/default timers are in the order of hundreds of milliseconds. For example, the relatively course granularity of TCP timers results in long timeout periods in response to packet discards, even in short range networks with few hops and small round trip times. Since an application's performance in a clustered system is often limited by Input/Output response times, large timeout windows can quickly degrade the application's performance.

Congestion control mechanisms can be broadly classified as link level mechanisms, subnet level mechanisms, and end-to-end mechanisms. Typically, link level mechanisms (e.g., IEEE 802.3 MAC and link layer mechanisms) try to optimize the flow of traffic over each link in the network to avoid frame discards due to transient congestion between nodes or stages at each end of the link. Subnet level mechanisms (e.g., IEEE 802.1D switching layer mechanisms) try to optimize traffic flow through a layer 2 subnetwork ("subnet") to avoid oversubscription of subnet resources. End-to-end mechanisms (including, e.g., upper layer protocols such as TCP/IP, operating systems, and applications) attempt to take action on the source flows or higher layer flow bundles (or aggregated flows) to avoid oversubscription of network resources end-to-end, that is, between ingress nodes to, and egress nodes from, the subnetwork.

It should be noted that reference herein to an ingress- or source-node is from the perspective of a layer 2 subnetwork ("subnet"). Thus, for example, an end-user station ("end station") connected to a layer 2 subnetwork and that generates frames of data is a source node with respect to the subnet. Likewise, a router connecting subnets may receive frames of data from one subnet and route at layer three such frames to a second subnet. The router, too, is a source node with respect to the second subnet, even though it merely forwards frames received from the first subnet to the second subnet. Similarly, the router is an egress node from the perspective of the first subnet, even though frames received by the router may be routed at the network layer onto the second subnet. The end station too may be an egress node. For example, if a user at the end station sends a request to a server connected to the same subnet or reachable via a router connected to the same subnet, a response from the server would be directed back to the end station, in which event, the end station is an egress- or destination-node from the perspective of the subnet to which it is attached.

An embodiment of the invention contemplates using layer 2 congestion indication (L2-CI) and path rate control (PRC) at the subnet level, and layer 2 support for higher layer mechanisms at or above the network level (layer 3 and up). L2-CI is a set of lower layer mechanisms for detecting congestion and signaling the congestion information to an edge of a subnet, either a destination (egress) node, or a source (ingress) node. PRC provides a congestion control interface to the higher layers and includes a set of mechanisms to enable dynamically controlling the rate at which frames of data are transmitted to the subnet in response to congestion indications. L2-CI and PRC are both primarily Level 2 mechanisms. At layer 3, congestion control mechanisms in the higher layers are enabled by the layer 2 congestion information. An example of a Level 3 mechanism is Explicit Congestion Notification in TCP/IP. (See Ramakrishnan, K., Floyd, S., Black, D., IETF RFC 3168—The Addition of Explicit Congestion Notification (ECN) to IP, September, 2001).

Layer 2 Congestion Indication

With reference to FIG. 1, L2-CI is a set of mechanisms for detecting congestion at one or more stages in the layer 2 subnet and conveying the congestion information to the edges of the subnet, in particular, conveying the congestion information to the ingress nodes responsible, at least in part, for causing the congestion. L2-CI provides information about the congestion in the subnet so that the appropriate action can be taken at the subnet ingresses and more particularly at the sources of flows contributing to the congestion in the subnet. L2-CI enables action to be taken proactively to avoid oversubscription of subnet resources and improve the overall network performance.

In FIG. 1, a multi-stage layer 2 switched interconnect is illustrated as subnet 100. A number of network interface controllers (NICs) 105a-105e is depicted at the edges of the subnet 100. A computing system (not shown) may include one or more of these NICs, that is, a NIC may be housed in a single, separate node, or the NICs and subnet may be implemented in a single computing system, such as a blade server or network layer (layer 3) router. Each stage in the multi-stage interconnect is implemented as one of switches 110a-110d. These switches may operate according to a switching protocol such as IEEE 802.1D. The NICs and switches are coupled to each other via links. For example, NIC 105b can reach NIC 105e via link 115, switch 110b, link 120, switch 110c, link 125, switch 110d and link 130. This series of links and switches between the ingress node to the switched interconnect (SI) represented by NIC 105b and the egress node from the SI, NIC 105e, is referred to herein a communication path. A unique communication path exists between any two nodes at the edges of the SI. For example, a separate communication path exists between NICs 105a and 105d, by way of link 117, switch 110a, link 118, switch 110c, link 125, switch 110d and link 127.

In one embodiment of the invention, the switches employ a virtual output queue (VOQ) with buffer sharing between ports. The switches may use an Active Queue Management (AQM) method to monitor congestion levels. For example, in one embodiment of the invention, a Random Early Detection (RED) algorithm is used to monitor the VOQs for congestion. If congestion is detected on a VOQ, then frames in that VOQ can either cause or supplement congestion indications or be discarded, depending on the congestion level.

FIG. 1 illustrates NICs 105a and 105b transmitting frames of data across switched interconnect 100, as depicted by respective dashed lines 170 and 175. Both data streams happen to converge at an output port of switch 110c, causing congestion at 140. The data streams are transmitted over link 125, switch 110d and link 130 before reaching egress node 105e.

In one embodiment of the invention, egress nodes coupled to the switched interconnect periodically generate congestion feedback messages 160. The period of time between congestion feedback messages is a function of the amount of traffic received at an egress node—an egress node may send congestion feedback messages at a selected maximum rate, or less frequently as traffic received by the egress node decreases. In the example illustrated in FIG. 1, the data flows from ingress nodes 105a and 105b arrive at egress node 105e and transferred to higher layer flows at 155, e.g., TCP/IP layers. Based on the amount of traffic being received at egress node 105e, the egress node transmits congestion feedback messages at appropriate intervals, one congestion feedback message per path per interval. The congestion feedback message 160 is received at switch 110c, which detects the feedback message is destined for ingress node 105b. Given switch 110c is experiencing congestion based at least in part on flows received from node 105b, switch 110c aggregates its congestion indication with the congestion feedback message 160 received from egress node 105e, and transmits an aggregated congestion feedback message 162 to ingress node 105b.

Although not shown in FIG. 1, since switch 110c is experiencing congestion based also in part on flows received from ingress node 105a, switch 110c likewise aggregates a congestion indication with a congestion feedback message received from egress node 105e, destined for ingress node 105a, and transmits the aggregated congestion feedback message to ingress node 105a. If, on the other hand, switch 110c was not experiencing congestion based on flows received from, for example, node 105a, the switch would merely forward the congestion feedback message received from egress node 105e to ingress node 105a unchanged.

When an aggregated congestion feedback message reaches an ingress node, such as node 105b, the congestion information is received by path rate control interface 260, which uses such information to update the path rate control tables 230. In this manner upper layer 165 is able to discern the level of congestion in a given path. In an embodiment using the TCP/IP as the upper layer protocols, the congestion information may then trigger the Explicit Congestion Notification (ECN) mechanisms in the TCP/IP suite, requesting the ingress node to reduce traffic injection rates, depending on the state of the upper layer queues.

Path Rate Control (PRC)

Figure 2:
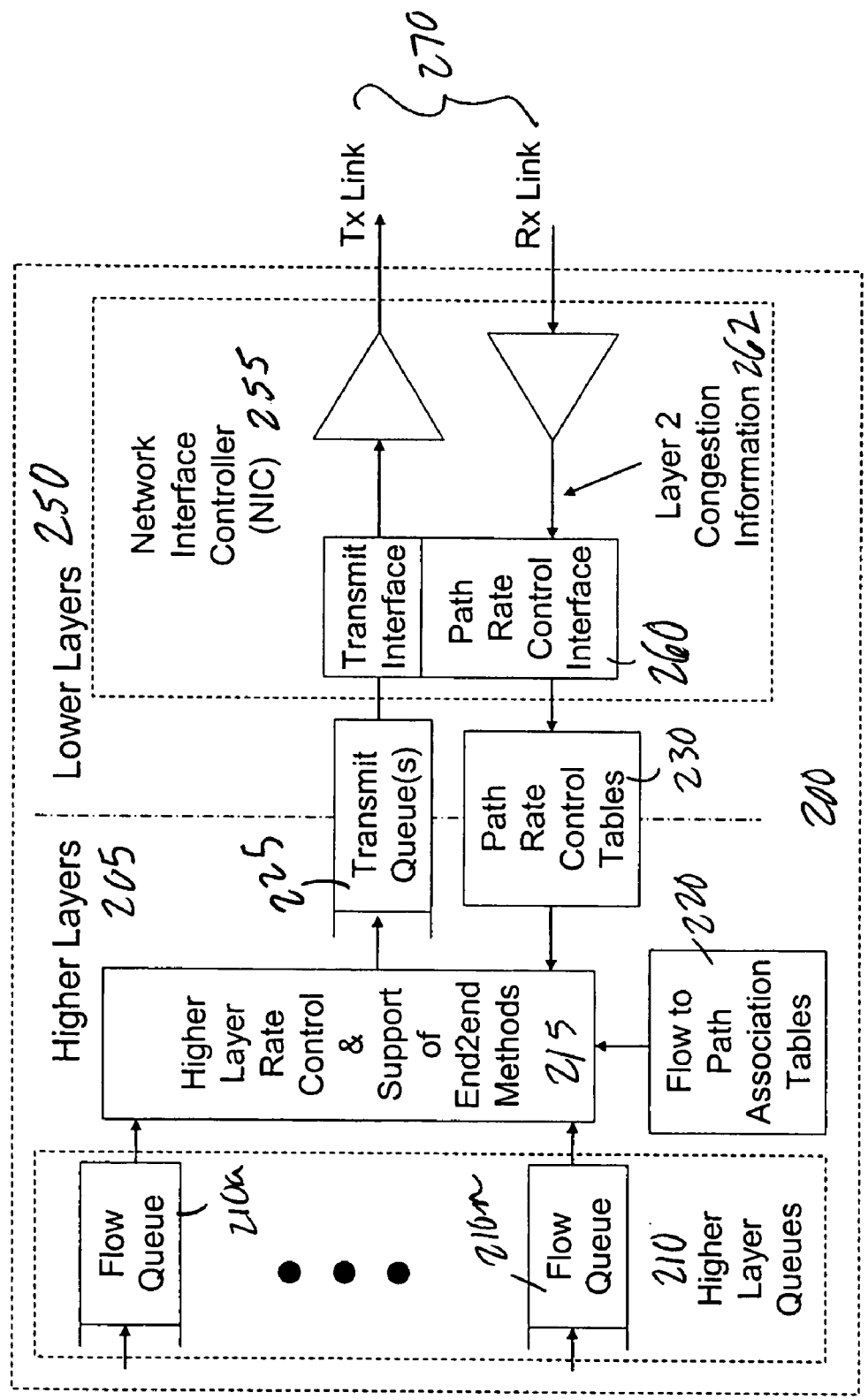
FIG. 2 is a block diagram of an embodiment of the invention.

With reference to FIG. 2, an embodiment of the invention uses PRC in a computing node 200 to provide an interface 202 between the higher layers 205 and lower layers 250 that enables the higher layers to rate control higher layer flows or flow bundles into NIC transmit queue(s) (or ring buffers) 225. In one embodiment of the invention the PRC interface implements the layer 2 Path Rate Control Interface 260 in NIC 255 hardware and the higher layer Rate Control 215 in driver level software. The higher layer side 205 uses address translation tables 220 to associate flows with paths. (In one embodiment, a path is defined as a physical destination MAC address from the perspective of a source, or transmitting, NIC.)

The NIC 255, which, for example, is further depicted as NIC 105b connected to switched interconnect 100 via link 115, supplies congestion-level and timing information to driver level software (e.g. Path Rate Control Tables 230) in node 200. This information enables the driver level software to dynamically rate control higher layer flows or flow bundles to the NIC to avoid oversubscription of lower layer resources. It enables the higher layers to discriminate between congested and non-congested paths and optimize the traffic flow to layer 2 ingresses to avoid blocking of frames and to maximize throughput efficiency. It also enables invoking higher layer end-to-end congestion control mechanisms (such as ECN, described above) via, for example, module 215, to deal with oversubscription at source nodes.

Controlling the rate of flow of data frames within the layer 2 subnet essentially buys more time for the end-to-end congestion control mechanisms such as ECN to do their job. In cases where the higher layer sources cannot react fast enough to avoid frame discards due to oversubscription, the PRC interface enables the higher layers to perform frame discarding above layer 2 by an algorithm that is most appropriate for the affected higher layer protocol.

In one embodiment of the invention, the PRC functionality is implemented as illustrated in FIG. 2. Frames handed down from the upper layers are queued in queues 210a-210n. Each queue may receive and temporarily hold related frames of data. For example, a particular queue may receive frames associated with the same flow, or bundle of flows. Alternatively, a queue may receive frames belonging to the same VLAN, VC, Quality of Service (QoS), class of service, type, connection (e.g., TCP connection) In another embodiment of the invention, the queues may be organized into a two-dimensional array of queues based on path and priority.

It should be appreciated that while the above description contemplates transfer of frames of data from upper layers to queues 210a-210n, in an alternative embodiment of the invention, such frames of data are transferred indirectly to the queues, wherein the frames may be stored in a memory buffer and instead pointers to the frames transferred to the queues. Thus, reference herein and in the claims to receipt of frames in these upper layer queues shall be construed either as the transfer of the frames of data to the queues, or the transfer of pointers for such frames to the queues.

The NIC maintains a table of congestion information, for example, indexed by a path index. The table may, for example, include a rate factor and an eligible time for each path. The rate factor is an indication of the congestion level on a path and the eligible time is a suggestion from the NIC as to the earliest time the next frame should be posted for that path. For non-congested paths, the rate factor may be zero and the eligible time is at least the current time or earlier.

When space is available in the NIC transmit queue(s) 225, frames are moved by higher layer rate control 215 from the upper layer queues (e.g., flow queues in the depicted embodiment) to the transmit queue(s) 225. In one embodiment of the invention, higher layer rate control 215 operates essentially as a scheduler, determining the order in which frames are transferred from the upper layer queues to the transmit queues 225 by 1) selecting only packets queued for paths with an eligible time less than or equal to the current time and 2) arbitrating between those frames, for example, according to a round-robin method such as a prioritized round-robin method. Alternatively, in one embodiment of the invention, a more sophisticated arbitration scheme may be used, such as contemplated in a telecommunications traffic management application, wherein characteristics of flows are managed, such as pacing of voice traffic.

While the above description contemplates transfer of frames of data from upper queues 210a-210n to transmit queues 225, in an alternative embodiment of the invention, the frames may be stored in a memory buffer and instead pointers to the frames transferred from the upper layer queues to the transmit queues. Thus, reference herein and in the claims to transfer of frames to the transmit queues shall be construed either as the transfer of the frames of data to the transmit queues, or the transfer of pointers for such frames to the transmit queues.

Each time the NIC 255 sends a frame from the transmit queue(s) to the link 270, it calculates the next eligible time for the corresponding path (determined, for example, by flow to path association tables, in which a destination address specified in the frame is associated with a particular path through the switched interconnect). The NIC calculates the next eligible time, for example, by multiplying the current rate factor for the path by the total number of bit times that will be consumed on the link by the frame currently being sent. The path rate factors are independently updated by congestion feedback from the layer 2 subnet, conveyed to the NIC by one of the L2-CI methods discussed above.

Reference throughout the specification to "one embodiment" or "an embodiment" means that a particular feature, structure or characteristic described in connection with the embodiment is included in at least one embodiment of the invention. Multiple references to "an embodiment" or "one embodiment" or "an alternative embodiment" herein do not necessarily refer to the same embodiment. Furthermore, the particular features, structures or characteristics may be combined as suitable in one or more embodiments of the invention.

What is claimed is:

1. A method, at a system comprising a network interface controller (NIC), comprising:
    receiving frames including congestion notifications for Ethernet paths, identification of the Ethernet paths comprising respective Ethernet media access control (MAC) destination addresses;
    updating a control table that associates the Ethernet paths with respective Ethernet path data based on the congestion notifications received by the NIC for the Ethernet paths;
    accessing a TCP (Transmission Control Protocol) flow to Ethernet path association table to determine an Ethernet path for a TCP flow having a TCP segment to transmit;
    based on the determined Ethernet path for the TCP flow, accessing the control table that associates Ethernet paths with respective Ethernet path data;
    based on the accessing of the control table, determining a next eligible time to transmit the TCP segment in the TCP flow, wherein the next eligible time is based, at least in part, on a current rate factor for the path and a number of bit times that will be consumed by a frame currently being sent;
    retaining the TCP segment in a one of multiple queues based on the determined next eligible time; and
    based on the determined next eligible time, dequeuing and transmitting the TCP segment in the one of the multiple queues.

2. The method of claim 1,
    wherein the Ethernet path data based on the congestion notifications comprises a next eligible time value for an Ethernet path.

3. The method of claim 2, wherein the Ethernet path data comprises a rate factor for an Ethernet path.

4. The method of claim 1, further comprising delaying transmission of data of a Transmission Control Protocol (TCP) connection to the NIC based on the Ethernet path data provided by the control table.

5. The method of claim 4, wherein the delaying comprises delaying dequeuing from a one of multiple queues associated with multiple respective TCP connections.

6. The method of claim 1, wherein the system comprises a software driver that operates on the Ethernet path data from the control table.

7. The method of claim 1, further comprising:
    based on the accessing of the Ethernet path data, performing TCP congestion management of the flow.

8. The method of claim 1, further comprising:
    performing Explicit Congestion Notification (ECN) congestion management based on the data provided by the control table.

* * * * *